United States Patent
Pattok et al.

(10) Patent No.: US 9,518,627 B2
(45) Date of Patent: Dec. 13, 2016

(54) CHANGES ENABLING THE ELIMINATION OF PROCESSES FOR A TORSION BAR

(71) Applicant: STEERING SOLUTIONS IP HOLDING CORPORATION, Saginaw, MI (US)

(72) Inventors: Eric D. Pattok, Frankenmuth, MI (US); Alan J. Armitage, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/554,600

(22) Filed: Nov. 26, 2014

(65) Prior Publication Data

US 2016/0146281 A1 May 26, 2016

(51) Int. Cl.
| | | |
|---|---|---|
| *F16F 1/14* | (2006.01) | |
| *C21D 1/18* | (2006.01) | |
| *B62D 5/083* | (2006.01) | |
| *B62D 6/10* | (2006.01) | |

(52) U.S. Cl.
CPC ............. *F16F 1/14* (2013.01); *B62D 5/083* (2013.01); *B62D 6/10* (2013.01); *C21D 1/18* (2013.01)

(58) Field of Classification Search
CPC ...... B25B 23/0021; B25B 13/06; B25B 21/02; B25G 1/105; F16F 1/16; B23P 9/00
USPC .... 267/154, 188, 273; 91/375 A; 74/388 PS; 280/124.107, 124.13; 29/527.1
See application file for complete search history.

(56) References Cited

U.S. PATENT DOCUMENTS

| | | | | | |
|---|---|---|---|---|---|
| 4,131,491 | A | * | 12/1978 | Joseph | B60G 21/0551 148/320 |
| 4,804,198 | A | * | 2/1989 | Imai | B62B 17/04 280/124.127 |
| 5,478,059 | A | | 12/1995 | Toyoshi et al. | |
| 5,520,376 | A | * | 5/1996 | Langa | B23P 9/00 267/154 |
| 5,979,209 | A | * | 11/1999 | Belliato | B21J 5/08 267/154 |
| 2006/0243355 | A1 | * | 11/2006 | Haiderer | B60G 21/055 148/593 |
| 2007/0017313 | A1 | | 1/2007 | Pattok et al. | |
| 2007/0261524 | A1 | * | 11/2007 | Suter | B21K 27/06 83/13 |
| 2008/0035413 | A1 | | 2/2008 | Segawa et al. | |

OTHER PUBLICATIONS

Extended Search Report regarding related EP Application No. 15 194 971.6; issued Mar. 22, 2016; 6 pgs.

* cited by examiner

*Primary Examiner* — Christopher Schwartz
(74) *Attorney, Agent, or Firm* — Cantor Colburn LLP

(57) ABSTRACT

In one aspect of the invention, a torsion bar assembly is provided. The assembly includes a first shaft having a first bore, a second shaft having a second bore, the second shaft operatively coupled to the first shaft, and a torsion bar positioned within the first and second bores. The torsion bar includes a splined first end having a first diameter extending to a first end face having a diameter generally the same as the first diameter, a splined second end having a second diameter extending to a second end face having a diameter generally the same as the second diameter, and an active diameter extending between the splined first end and the splined second end. The torsion bar is fabricated from a material having a hardness greater than 45 Rockwell C-Scale.

7 Claims, 7 Drawing Sheets

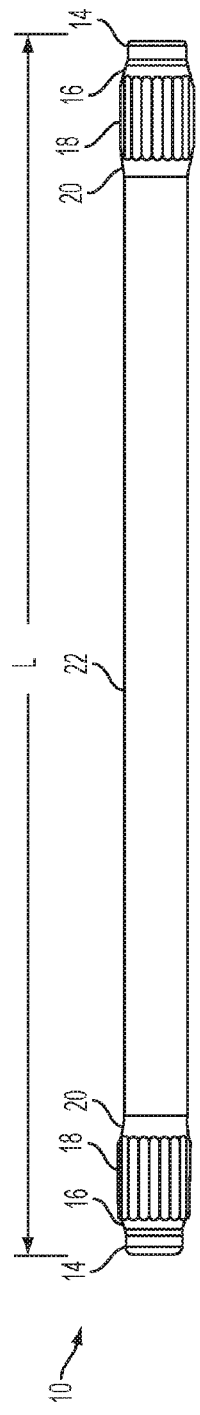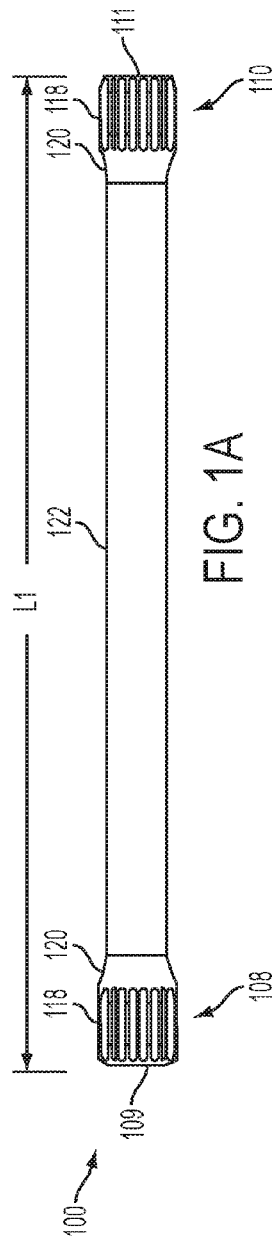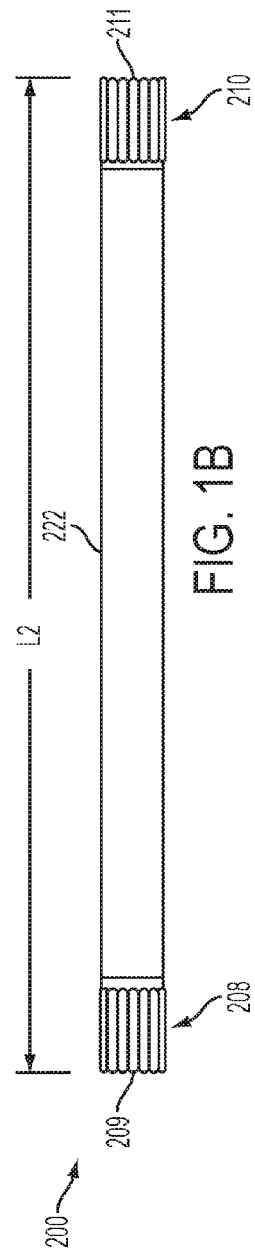

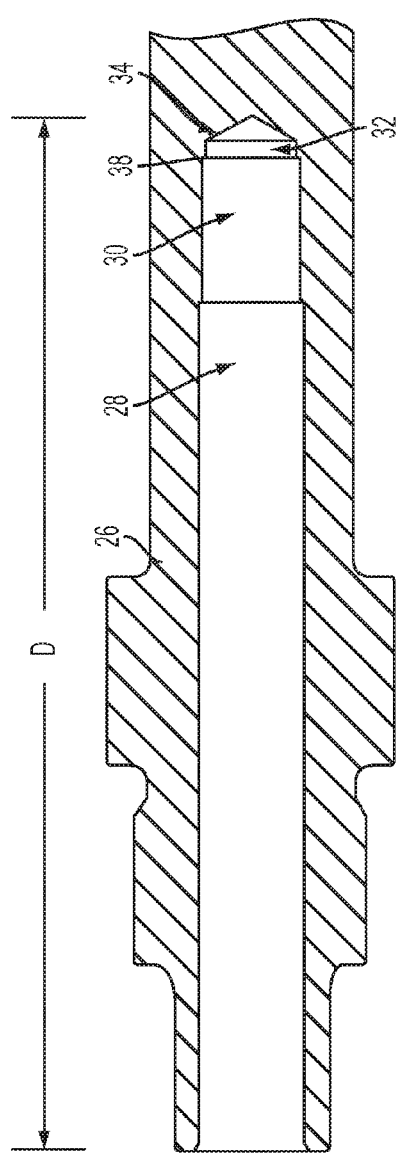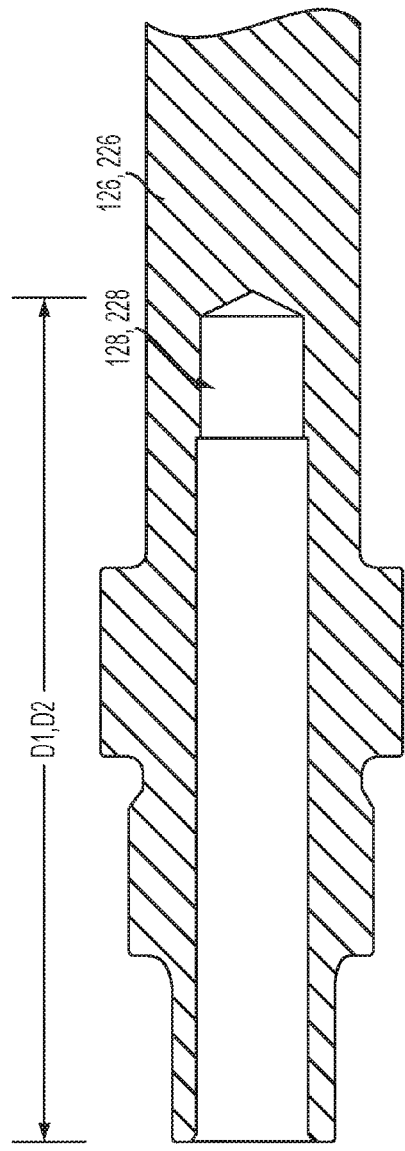
PRIOR ART
FIG. 3
FIG. 3A

CHANGES ENABLING THE ELIMINATION OF PROCESSES FOR A TORSION BAR

FIELD OF THE INVENTION

The subject invention relates to a torsion bar, and more particularly, to a torsion bar for a power steering assembly.

BACKGROUND OF THE INVENTION

A power steering assembly of a vehicle may include a power assisted device that facilitates the turning of a steering wheel by a vehicle operator. In order to achieve the function of the power steering, it may be necessary to provide a torsion bar. However, processes required to fabricate the torsion bar to a specified rate may be expensive and time consuming, particularly if it includes a profile grind cycle process. Further, it was historically believed that torsion bars needed to be fabricated from relatively soft materials with little or no hardening of the material because the assembly process typically involved drilling and reaming, which reduced tool life. Thus, torsion bars were not hardened in order to increase tool life. A secondary function of the torsion bar is to regain the original neutral position of the steering wheel after the steering wheel is turned and then relieved of torque; commonly known as hysteresis. This led to long torsion bars that required multiple processing steps during manufacture. Accordingly, it is desirable to provide a torsion bar with shorter length, lower hysteresis, and that undergoes less manufacturing processes.

SUMMARY OF THE INVENTION

These and other advantages and features will become more apparent from the following description taken in conjunction with the drawings.

In one aspect of the invention, a torsion bar for a steering column assembly is provided. The torsion bar includes a splined first end having a first diameter extending to a first end face having a diameter generally the same as the first diameter, a splined second end having a second diameter extending to a second end face having a diameter generally the same as the second diameter, and an active diameter extending between the splined first end and the splined second end.

In another aspect of the invention, a torsion bar assembly for a steering column assembly is provided. The assembly includes a first shaft having a first bore, a second shaft having a second bore, the second shaft operatively coupled to the first shaft, and a torsion bar positioned within the first and second bores. The torsion bar includes a splined first end having a first diameter extending to a first end face having a diameter generally the same as the first diameter, a splined second end having a second diameter extending to a second end face having a diameter generally the same as the second diameter, and an active diameter extending between the splined first end and the splined second end.

In yet another aspect of the invention, a method of fabricating a torsion bar having a first end and a second end is provided. The method includes performing a shear operation on the torsion bar, performing a serration rolling operation on the first and second ends, and performing a hardening process on the torsion bar, the hardening process hardening the torsion bar to a hardness of between 48 and 55 Rockwell C-Scale.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of a prior art torsion bar;

FIG. 1A is a schematic illustration of a torsion bar according to a first embodiment;

FIG. 1B is a schematic illustration of a torsion bar according to a second embodiment;

FIG. 3 is a cross-sectional view of a shaft of the prior art assembly shown in FIG. 2;

FIG. 3A is a cross-sectional view of a shaft of the exemplary assemblies shown in FIGS. 2A and 2B;

DETAILED DESCRIPTION

Described herein are systems and methods for manufacturing a reduced-length torsion bar with lower hysteresis and less processing steps than previously known torsion bars. The torsion bars described herein undergo increased hardening, which facilitates production of a shorter torsion bar that does not require processing steps such as washing, profile grinding, or shot peening, for example.

Figure 2:
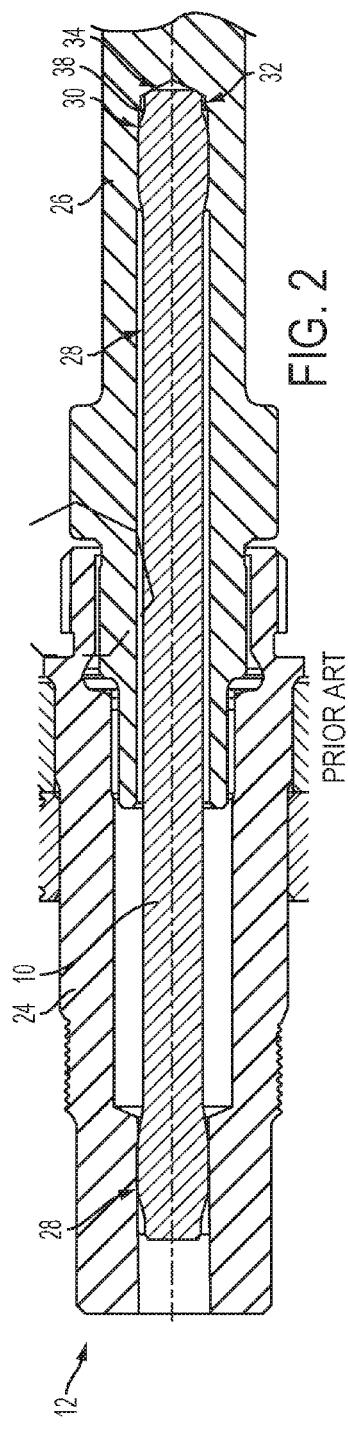
FIG. 2 is a cross-sectional view of a comparison between a prior art torsion bar assembly.
Figure 2A:
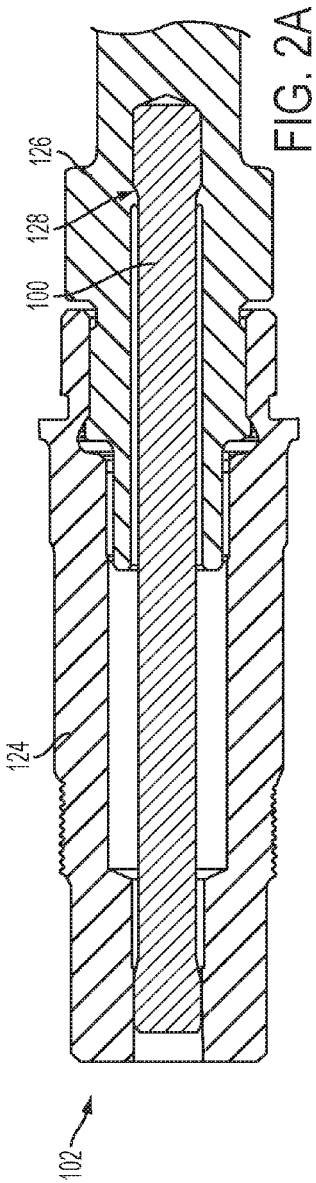
FIG. 2A is a cross-sectional view of a torsion bar assembly according to a first embodiment.
Figure 2B:
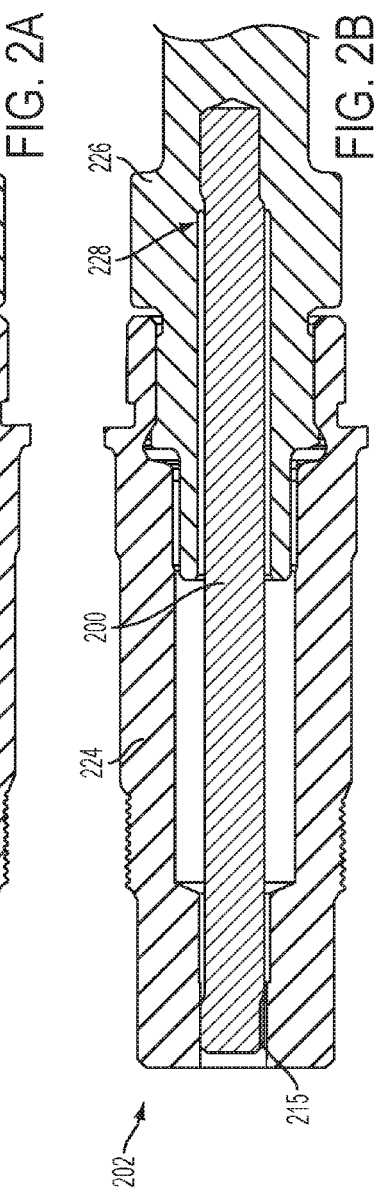
FIG. 2B is a cross-sectional view of a torsion bar assembly according to a second embodiment.

Referring now to the Figures, where the invention will be described with reference to specific embodiments, without limiting same, illustrated is a prior art torsion bar 10 (FIG. 1) for a steering column assembly, an exemplary torsion bar 100 (FIG. 1A) for a steering column assembly according to the invention, and another exemplary torsion bar 200 (FIG. 1B) for a steering column assembly according to the invention. FIG. 2 illustrates a prior art torsion bar assembly 12, FIG. 2A illustrates an exemplary torsion bar assembly 102 according to the invention, and FIG. 2B illustrates another exemplary torsion bar assembly 202 according to the invention.

As shown in FIG. 1, prior art torsion bar 10 includes a bullet nose 14, a press chamfer 16, a splined large diameter 18, a blend 20, and an active diameter 22. As shown in FIGS. 2 and 3, torsion bar assembly 12 includes a first shaft 24, a second shaft 26, and prior art torsion bar 10. Second shaft 26 includes a drilled clearance bore 28 to maintain clearance to active diameter 22, a press bore 30 to engage splined large diameter 18, and a pre-drill bore 32.

With reference to FIGS. 1-3, torsion bar 10 is pressed into bore 28 and includes bullet nose 14 to seat on a drill tip cone 34 of bore 28. Historically, press loads in the pressing operation were kept as low as possible. Typically, press interference and therefore tolerances of the spline and press bore diameters were kept small. The tight tolerances forced the need for a reaming operation to create bore 30 in shafts 24, 26 and a grinding operation on the tips of splines 18 of torsion bar 10. Before reaming could be done, a pre-drill operation was performed to remove most of the material because precision reaming depends on only a slight material removal. Thus, after drilling bore 28, a pre-drill operation was required to create bore 32 from drill cone 30 to the end location of clearance bore 28. Then a reamer was used to form a press bore 36 and produce tighter tolerances. However, a shoulder 38 (FIG. 3) created by the reamer was not big enough to act as a final stop for the axial pressing operation of torsion bar 10 due to variation of drill sizes, reamer sizes, and bore true positioning. This could produce situations in which torsion bar 10 had large variations in its bottom load and axial press location. In order to alleviate issues that could arise with shoulder 38, bullet nose 14 was added to prior art torsion bar 10 to produce a definitive measurable bottom load variation by contacting drill cone 30. However, bullet nose 14 added length to torsion bar 10, which required extra drilling depth for drill bore 28.

Press chamfer 16 was added to prior art torsion bar 10 to both minimize press loads and reduce incidents of galling. Active diameter 22 has historically been designed at the upper limit of the allowable torsional stress required for fatigue life and hysteresis. Large diameter feature 18 provides sufficient material by increasing to a diameter larger than active diameter 22 in order to transfer torque from torsion bar 10 to mating shaft 24, 26. Without this extra material, the combination of torsional stress and the stress from the interface between torsion bar 10 and shafts 24, 26 would reduce fatigue life and add hysteresis.

Blend 20 was added to torsion bar 10 to prevent adding a stress riser as the diameter increased from active diameter 22 to large diameter 18. A profile grind process is used in the manufacture of torsion bar 10 due to the tight tolerances required for active diameter 22 or torsional rate and at the interface large diameter 18 to reduce press interference. Bullet nose 14, press chamfer 16, and blend 20 are additionally created during the profile grind to reduce the number of process steps. However, the profile grind process may be time consuming and expensive. Further, the long torsion bar 10 requires more material, which may be costly, and shafts 24 and/or 26 may require time consuming and more costly drilling, reaming, and/or pinning steps to configure to the longer torsion bar.

As illustrated in FIGS. 1A and 2A, torsion bar 100 is a cylindrical type torsion bar having a circular cross-section and includes a splined first end 108, a splined second end 110, a large diameter 118, a blend 120, and an active diameter 122. Splined first end 108 extends to a first end face 109, and first end face 109 has a diameter generally the same as the diameter of splined first end 108. As used herein, the term "generally the same" means the same diameter or a diametrical difference that occurs natural or is only expediently formed to facilitate assembly, as further described herein. Splined second end 110 extends to a second end face 111, and second end face 111 has a diameter generally the same as the diameter of splined second end 110. Active diameter 122 has a diameter that is less than the large diameter 118 of splined first and second ends 108, 110.

Torsion bar 100 has a length 'L1' that is less than a length 'L' of prior art torsion bar 10. For example, in one embodiment, length 'L' is approximately 126 mm and length 'L1' is between 90 mm and 110 mm or between approximately 90 mm and approximately 110 mm. In another embodiment, 'L1' is between 95 mm and 105 mm or between approximately 95 mm and approximately 105 mm. In yet another embodiment, 'L1' is between 100 mm and 104 mm or between approximately 100 mm and approximately 104 mm.

As shown in FIG. 2A, torsion bar assembly 102 includes a first shaft 124, a second shaft 126, and a drill bore 128. However, drill bore 128 has a depth 'D1' that is less than a depth 'D' of prior art drill bore 28 (FIG. 3) and does not include a reamer bore 30 or shoulder 38. Thus, torsion bar 100 requires less material and a shorter drilling time for bore 128 than prior art torsion bar 10. In one embodiment, depth 'D1' is between 20 mm and 30 mm shorter than depth 'D' or between approximately 20 mm and approximately 30 mm shorter. In another embodiment, depth 'D1' is between approximately 25 mm and 27 mm shorter or between approximately 25 mm and 27 mm shorter than depth 'D'.

In the exemplary embodiment, torsion bar 100 undergoes a hardening step to increase the hardness of torsion bar 100 such that it is harder than prior art torsion bar 10. This enables torsion bar 100 to be manufactured with length 'L1' that is less than prior art length 'L' and reduces hysteresis (e.g., by approximately 50%). Although prior art torsion bar 10 may be subjected to a slight hardening process, it is only done for reduction of galling during the press operation, and bar 10 is only hardened to an upper limit of 40 Rockwell C-Scale hardness. Thus, prior art torsion bar 10 is still considered a "soft" torsion bar.

In contrast, torsion bar 100 is subjected to a hardening process and is hardened to greater than or equal to 45 Rockwell C-Scale hardness. In one embodiment, torsion bar 100 is hardened to between 48 and 55 Rockwell C-Scale hardness or between approximately 48 and approximately 55 Rockwell C-Scale hardness. Torsion bar 100 has a higher hardness than torsion bar 10, which enables the reduced length 'L1' while providing reduced hysteresis. Further, increased hardness allows more press interference, which allows more size tolerance to be given to both press bores 128 and the spline major diameter.

Due to the increased hardness of torsion bar 100, it does not have to undergo a shot peening process like prior art torsion bar 10. The process of shot peening is a process required in soft torsion bar 10 in order to increase fatigue life in torsion bar 10. Thus, a shot peening step is not required for torsion bar 100 because the higher hardness significantly increases the yield point, and the reduction in the maximum twist angle reduces the stress. In other words, torsional stress is a function of torque applied, diameter, and twist angle, and reducing the twist angle reduces the stress.

As previously discussed, bullet nose 14 was included in torsion bar 10 in order to reach around shoulder 38 created at the interface between the pre-drill and the reamer features. This was to ensure that the bar 10 bottomed out on drill tip cone 34 to make the press versus displacement curves easier to read and predict. However, with torsion bar 100, elimination of the reaming operation allows the elimination of a bullet nose, which increases the life of the grinding wheel (not shown), due to the fact that this is the deepest ground portion of the shaft, and further reduces cost.

Figure 4:
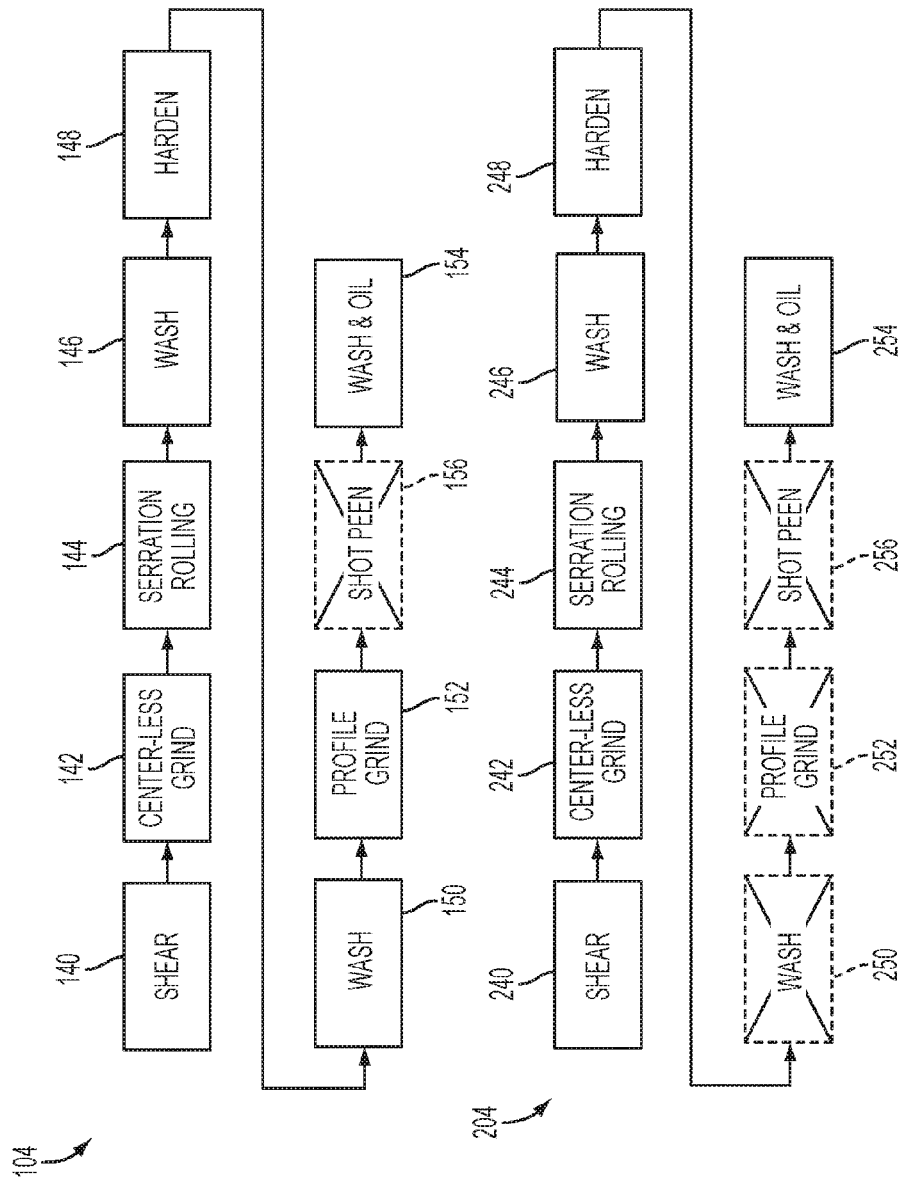
FIG. 4 is a schematic illustration of exemplary manufacturing processes according to the invention.

FIG. 4 illustrates a manufacturing process 104 for torsion bar 100 that includes a shear step 140, a center-less grinding step 142, a serration rolling step 144, a wash step 146, a hardening step 148, a wash step 150, a profile grind step 152, and a wash and oil step 154. Shear step 140 may include cutting the torsion bar blank to the correct length, center-less grinding step 142 may include feeding through a grinder, and serration rolling step 144 may include forming splines into torsion bar 100. In wash step 146, torsion bar may be flooded with lubricant and washed, in hardening step 148 torsion bar 100 may be placed in a furnace and heated (e.g., to about 1500°) and subsequently quenched, and in wash step 150 torsion bar 100 may be washed to remove quench oil. In wash and oil step 154, torsion bar 100 may be washed from contaminants (e.g., iron powder) and given an anti-rust coating of oil.

As illustrated, compared to prior art manufacturing processes, process 104 eliminates a shot peen process 156 due to the increased hardness of torsion bar 100, as discussed above.

Figure 5:
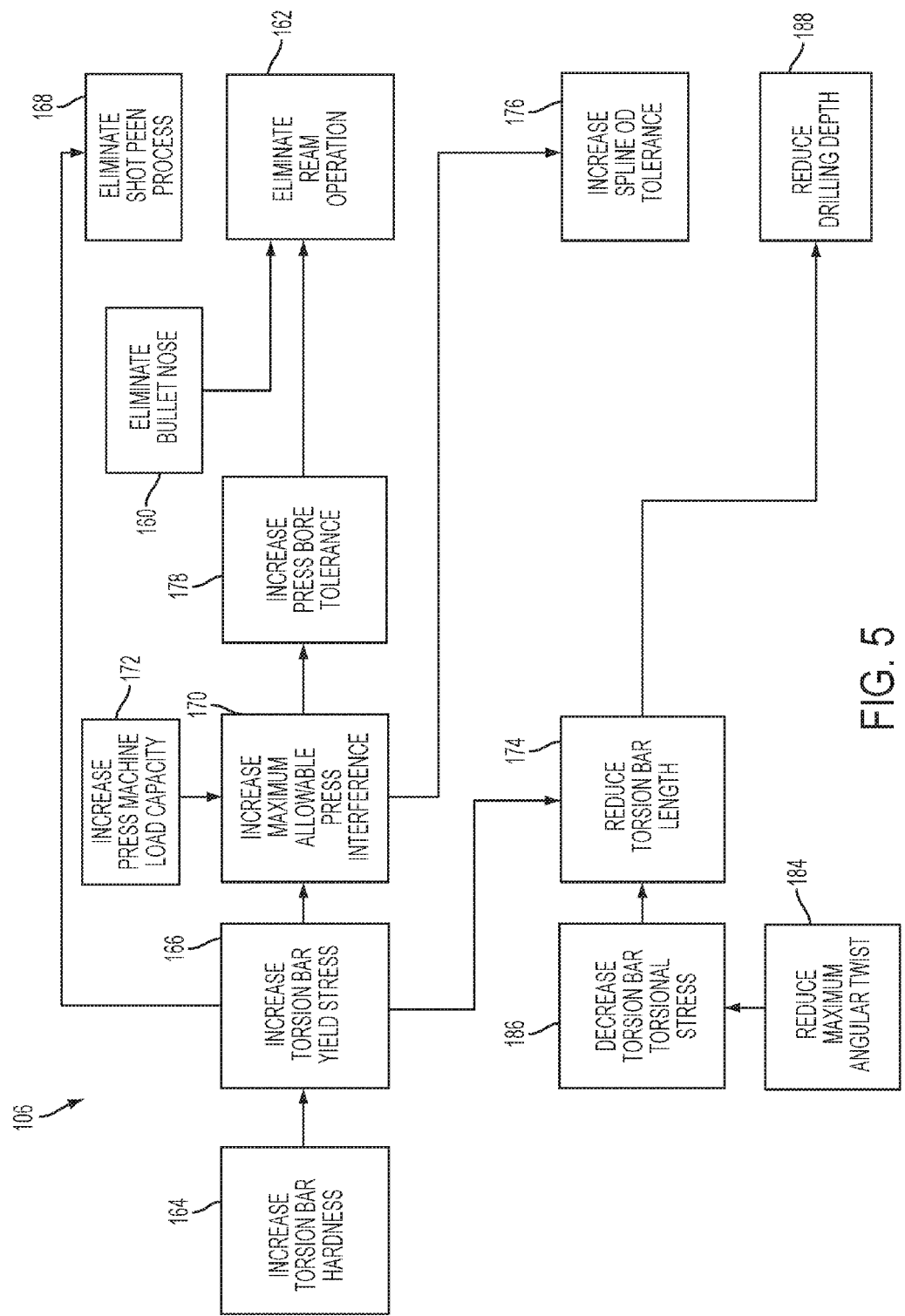
FIG. 5 is a chart of design enhancements of one of the exemplary torsion bars shown in FIGS. 1A and 1B.

As shown in FIG. 5, the design changes or enhancements of torsion bar 100 compared to prior art torsion bar 10 provide the following attributes, which are illustrated in chart 106. In the exemplary embodiment, (1) elimination of the bullet nose 160 facilitates elimination of the ream operation 162; (2) an increase in the torsion bar hardness 164 facilitates an increase in torsion bar yield stress 166, which facilitates elimination of the shot peen process 168, an increase in maximum allowable press interference 170 (along with an increased press machine load capacity 172), and a reduced torsion bar length 174. The increased maximum allowable press interference 170 facilitates an increase in spline outer diameter tolerance 176, and an increased press bore tolerance 178, which facilitates elimination of the ream operation 162; (3) a reduced maximum angular twist 184 decreases torsion bar torsional stress 186 and facilitates reduced torsion bar length 174; and (4) reduced torsion bar length 174 facilitates reduced drilling depth 188 in shafts 124, 126. Thus, as illustrated, design enhancements 160, 164, 174, 178, and 184 facilitate manufacturing improvements 162, 168, 176, and 188.

As illustrated in FIGS. 1B and 2B, torsion bar 200 is a cylindrical type torsion bar having a circular cross-section and includes first and second splined ends 208 and 210. Splined first end 208 extends to a first end face 209, and first end face 109 has a diameter generally the same as the diameter of splined first end 208. As used herein, the term "generally the same" means the same diameter or a diametrical difference that occurs natural or is only expediently formed to facilitate assembly. Splined second end 210 extends to a second end face 211, and second end face 211 has a diameter generally the same as the diameter of splined second end 210.

Torsion bar 200 has a length 'L2' that is less than length 'L' of prior art torsion bar 10 For example, in one embodiment, length 'L' is approximately 126 mm and length 'L2' is between 90 mm and 110 mm or between approximately 90 mm and approximately 110 mm. In another embodiment, 'L2' is between 95 mm and 105 mm or between approximately 95 mm and approximately 105 mm. In yet another embodiment, 'L2' is between 100 mm and 104 mm or between approximately 100 mm and approximately 104 mm.

As shown in FIG. 2B, torsion bar assembly 202 includes a first shaft 224, a second shaft 226, and a drill bore 228. However, drill bore 228 has a depth 'D2' that is less than depth 'D' of prior art drill bore 28 (FIG. 3) and does not include a reamer bore 30 or shoulder 38. Moreover, torsion bar 200 does not require a bullet nose, press chamfer, large diameter, blend, or profile grind step. Thus, torsion bar 100 requires less material and a shorter drilling time of bore 228 than prior art torsion bar 10. In one embodiment, depth 'D2' is between 20 mm and 30 mm shorter than depth 'D' or between approximately 20 mm and approximately 30 mm shorter. In another embodiment, depth 'D2' is between approximately 25 mm and 27 mm shorter or between approximately 25 mm and 27 mm shorter.

In the exemplary embodiment, torsion bar 200 undergoes a hardening step to increase the hardness of torsion bar 200 such that it is harder than prior art torsion bar 10. This enables torsion bar 20 to be manufactured with length 'L2' that is less than prior art length 'L' and reduces hysteresis (e.g., by approximately 50%). Although prior art torsion bar 10 may be subjected to a slight hardening process, it is only done for reduction of galling during the press operation, and bar 10 is only hardened to an upper limit of 40 Rockwell C-Scale hardness. Thus, prior art torsion bar 10 is still considered a "soft" torsion bar.

In contrast, torsion bar 200 is subjected to a hardening process and is hardened to greater than or equal to 45 Rockwell C-Scale hardness. In one embodiment, torsion bar 200 is hardened to between 48 and 55 Rockwell C-Scale hardness or between approximately 48 and approximately 55 Rockwell C-Scale hardness. Torsion bar 200 has a higher hardness than torsion bar 10, which enables the reduced length 'L2' while providing reduced hysteresis. Further, increased hardness allows more press interference, which allows more size tolerance to be given to both press bores 228 and the spline major diameter Due to the increased hardness of torsion bar 200, it does not have to undergo a shot peening process like prior art torsion bar 10. The process of shot peening is a process required in soft torsion bar 10 for a drill/ream/pin system, for example, in order to increase fatigue life in torsion bar 10. Thus, a shot peening step is not required for torsion bar 200 because the higher hardness significantly increases the yield point, and the reduction in the maximum twist angle reduces the stress.

As previously discussed, bullet nose 14 was included in torsion bar 10 in order to reach around shoulder 38 created at the interface between the pre-drill and the reamer features. This was to ensure that the bar 10 bottomed out on drill tip cone 34 to make the press versus displacement curves easier to read and predict. However, with torsion bar 200, elimination of the reaming operation allows the elimination of a bullet nose, which increases the life of the grinding wheel (not shown) and further reduces cost.

Large diameter 18 was included in torsion bar 10 to provide enough material to transfer torque without distorting the torsion bar, which could lead to reduced life and hysteresis. However, the hardness level of torsion bar 10 is limited because drilling into hardened materials reduces tool life and necessitates frequent changing of the drills. In contrast, torsion bar 200 no longer requires the large diameter shape, and the manufacturing process after adding the serrations is eliminated.

Moreover, the pre-roll diameter of splined ends 208, 210 is equal to or substantially equal to an active diameter 222 (FIG. 1-1B). As such, after the serration rolling process, the minor diameter 215 of the serrations is smaller than the diameter of active diameter 222.

In addition, torsion bar 200 has a smaller spline diameter and fewer teeth than prior art torsion bar 10, which is accomplished by reducing the maximum twist angle allowed in torsion bar 200. In order to achieve this, a new torsion bar centering machine is provided that holds a better tolerance on the centering process. This reduction in centering subsequently enables the maximum twist angle to be reduced.

Figure 6:
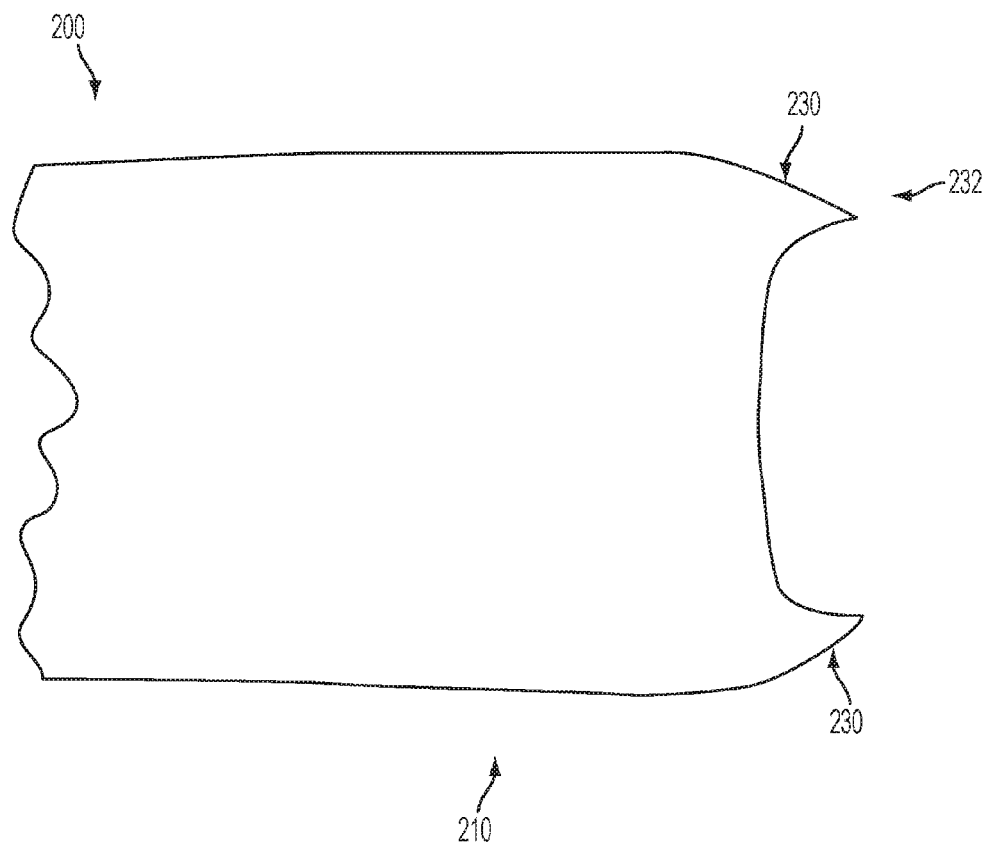
FIG. 6 is an enlarged side view of a portion of one of the exemplary torsion bars shown in FIGS. 1A and 1B.

In the exemplary embodiment, a press chamfer 16 is eliminated for torsion bar 200. However, as illustrated in FIG. 6, a natural blend 234 occurs because the end of torsion bar 200 is unrestrained. Thus, during a serration rolling process, the metal follows the path of least resistance causing axial growth at the outer edge 236 of torsion bar 200. This causes a non-fill condition in the die which may then be used as a lead-in chamfer/blend for the pressing operation. It should be noted that natural blend 234 occurs naturally, while devoted processes are used to form press chamfer 16 and blend 20 in torsion bar 10.

FIG. 4 illustrates a manufacturing process 204 for torsion bar 200 that includes a shear step 240, a center-less grinding step 242, a serration rolling step 244, a wash step 246, a hardening step 248, and a wash and oil step 254. As illustrated, compared to prior art manufacturing processes, process 204 eliminates a wash step 250, a profile grind step 252, and a shot peen process 256 due to the increased hardness of torsion bar 100, as discussed above.

Figure 7:
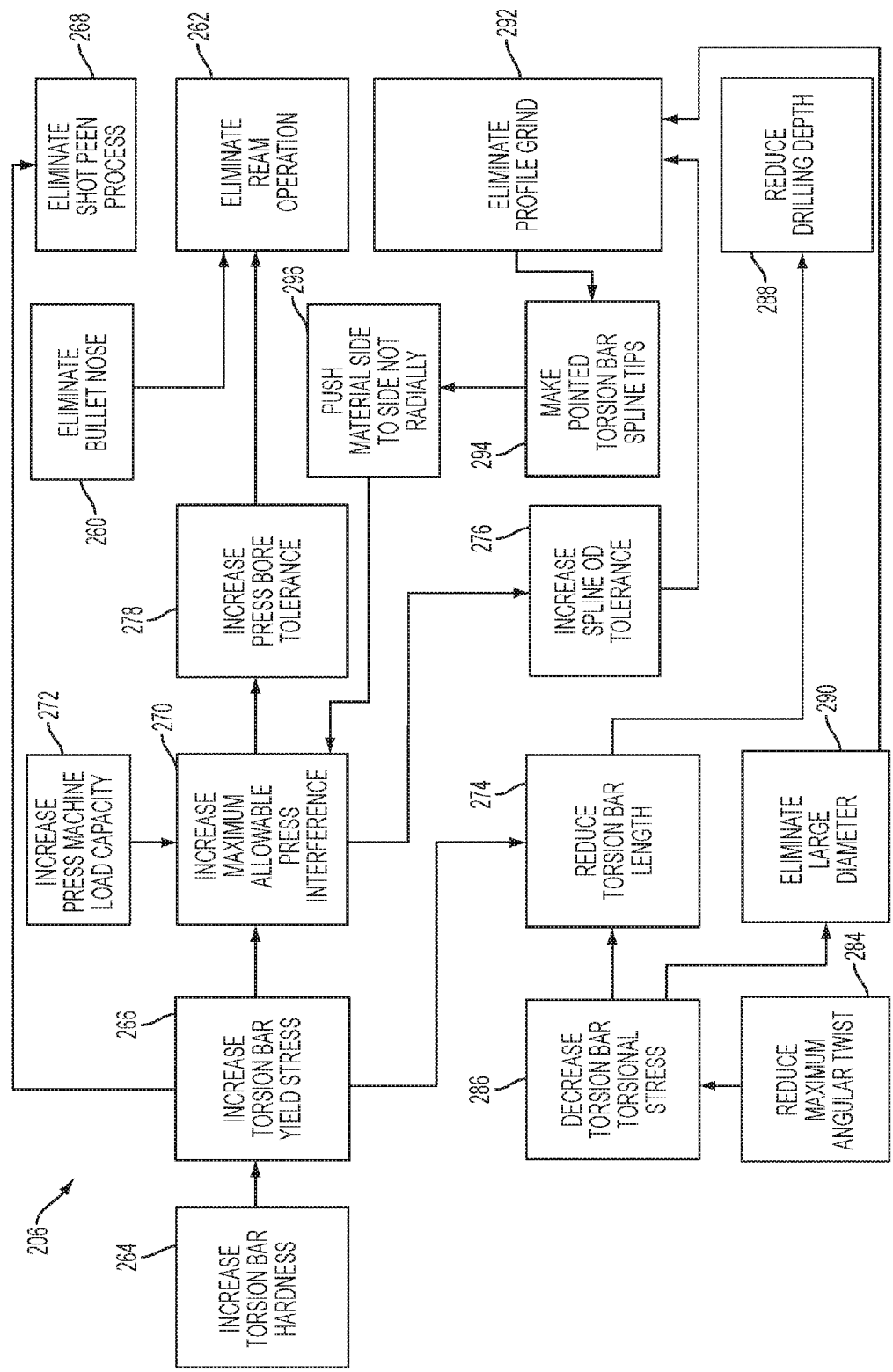
FIG. 7 is a chart of design enhancement of one of the exemplary torsion bars shown in FIGS. 1A and 1B.

As shown in FIG. 7, the design changes or enhancements of torsion bar 200 compared to prior art torsion bar 10 provides the following attributes, which are illustrated in chart 206. In the exemplary embodiment, (1) elimination of the bullet nose 260 facilitates elimination of the ream operation 262; (2) an increase in the torsion bar hardness 264 facilitates an increase in torsion bar yield stress 266, which facilitates elimination of the shot peen process 268, an increase in maximum allowable press interference 270 (along with an increased press machine load capacity 272), and a reduced torsion bar length 274. The increased maximum allowable press interference 270 facilitates an increase in spline outer diameter tolerance 276, and an increased press bore tolerance 278, which facilitates elimination of the ream operation 262; (3) a reduced maximum angular twist 284 decreases torsion bar torsional stress 286. Decreased torsional stress 286 facilitates reduced torsion bar length 274 and eliminates a large diameter or any diameter (larger than the active diameter) shape 290, which facilitates elimination of a profile grind step 292. The increase spline outer diameter tolerance 276 also facilitates elimination of the profile grind step 192; (4) reduced torsion bar length 274 facilitates a reduced drilling depth 288 in shafts 224, 226; and (5) elimination of the profile grind 292 facilitates production of pointed spline tips 294, which facilitates deformation of the press bore material from side to side 296 (not radially). This facilitates increasing the maximum allowable press interference 270. Thus, as illustrated, design enhancements 260, 264, 274, 276, 278, 284, and 290 facilitate manufacturing improvements 262, 268, 288, and 292.

Described herein are systems and methods for improved torsion bar manufacture. By making design enhancements in the torsion bar manufacture, previously required processes may be reduced or eliminated. For example, the torsion bar may undergo a hardening process, which enables the torsion bar to be shorter than previous designs. As such, a bullet nose, large diameter, and chamfers that were once required for torsion bars may now be eliminated. Further, processing steps such as shot peening, reaming, and profile grinding may be eliminated. Accordingly, the improved torsion bars described herein provide the same function as previous torsion bars, but with reduced cost and processing time.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torsion bar assembly for a steering column assembly, the torsion bar assembly comprising:
    a first steering column shaft having a first bore;
    a second steering column shaft having a second bore, the second shaft operatively coupled to the first shaft; and
    a torsion bar positioned within the first and second bores, the torsion bar, the first and second bores coaxially aligned along their respective longitudinal axes, the torsion bar comprising:
        a splined first end having a first diameter extending completely to a first end face having a diameter generally the same as the first diameter;
        a splined second end having a second diameter extending completely to a second end face having a diameter generally the same as the second diameter;
        an active diameter extending between the splined first end and the splined second end; and
        a minor diameter of the splined first end smaller than the active diameter.

2. The torsion bar assembly of claim 1, wherein at least one of the first and second diameters is equal to the active diameter.

3. The torsion bar assembly of claim 2, wherein the at least one of the splined first and second ends does not include a blend between the large diameter and the active diameter.

4. The torsion bar assembly of claim 1, wherein at least one of the splined first and second ends does not include a bullet nose.

5. The torsion bar assembly of claim 1, wherein the torsion bar has a length between 90 mm and 110 mm.

6. The torsion bar assembly of claim 1, wherein the torsion bar is fabricated from a material having a hardness of between 48 and 55 Rockwell C-Scale.

7. The torsion bar assembly of claim 1, wherein the first bore does not include a reamer bore.

* * * * *